US012509183B2

(12) United States Patent
Sellen

(10) Patent No.: US 12,509,183 B2
(45) Date of Patent: Dec. 30, 2025

(54) TRANSMISSION UNIT FOR VEHICLE EQUIPPED WITH PROPULSION PEDALS

(71) Applicant: Stephan Sellen, Wehingen (DE)

(72) Inventor: Stephan Sellen, Wehingen (DE)

(73) Assignee: Stephan Sellen, Wehingen (DE)

( * ) Notice: Subject to any disclaimer, the term of this patent is extended or adjusted under 35 U.S.C. 154(b) by 0 days.

(21) Appl. No.: 18/852,835

(22) PCT Filed: Mar. 31, 2023

(86) PCT No.: PCT/EP2023/058429
§ 371 (c)(1),
(2) Date: Sep. 30, 2024

(87) PCT Pub. No.: WO2023/187140
PCT Pub. Date: Oct. 5, 2023

(65) Prior Publication Data
US 2025/0223007 A1 Jul. 10, 2025

(30) Foreign Application Priority Data
Mar. 31, 2022 (LU) ........................................ 501762

(51) Int. Cl.
B62M 11/14 (2006.01)
B62M 6/55 (2010.01)
B62M 11/18 (2006.01)

(52) U.S. Cl.
CPC .............. B62M 11/18 (2013.01); B62M 6/55 (2013.01); B62M 11/145 (2013.01);
(Continued)

(58) Field of Classification Search
CPC ...... B62M 11/18; B62M 6/55; B62M 11/145; F16H 2200/2012; F16H 2200/2074; F16H 2200/2089
See application file for complete search history.

(56) References Cited

FOREIGN PATENT DOCUMENTS

DE 102016225142 A1 * 6/2018 .......... B62M 11/145
DE 102017219602 A1 5/2019
(Continued)

OTHER PUBLICATIONS

International Search Report to corresponding PCT/EP2023/058429 mailed on Jun. 6, 2023.
(Continued)

Primary Examiner — Justin Holmes
(74) Attorney, Agent, or Firm — Sandberg Phoenix & von Gontard, P.C.

(57) ABSTRACT

A transmission unit for a vehicle equipped with propulsion pedals, comprising: a central shaft; a transmission output shaft coaxial with the central shaft; a planetary gear unit carried by the central shaft and configured for transmitting mechanical power from an input shaft of the planetary gear unit to the transmission output shaft; an electric motor unit; a housing carrying the central shaft, the transmission output shaft and the planetary gear unit; the electric motor unit is coaxial with the central shaft and comprises an output shaft fixedly coupled to the input shaft of the planetary gear unit, and the central shaft is coupled to the output shaft of the electric motor unit and the input shaft of the planetary gear unit by a freewheel.

20 Claims, 4 Drawing Sheets

(52) U.S. Cl.
CPC ............... *F16H 2200/2012* (2013.01); *F16H 2200/2074* (2013.01); *F16H 2200/2089* (2013.01)

(56) References Cited

FOREIGN PATENT DOCUMENTS

| | | | | |
|---|---|---|---|---|
| DE | 102018208380 A1 | * | 11/2019 | ............ B62M 11/14 |
| DE | 102018217096 A1 | | 4/2020 | |
| DE | 102019208536 A1 | | 12/2020 | |
| EP | 3599154 A1 | * | 1/2020 | .......... B62M 11/145 |
| JP | H09169290 A | * | 6/1997 | |
| WO | WO-2018108490 A1 | * | 6/2018 | .......... B62M 11/145 |
| WO | 2019015711 A | | 1/2019 | |

OTHER PUBLICATIONS

Written Opinion to corresponding PCT/EP2023/058429 mailed on Jun. 6, 2023.

\* cited by examiner

[Fig. 1]
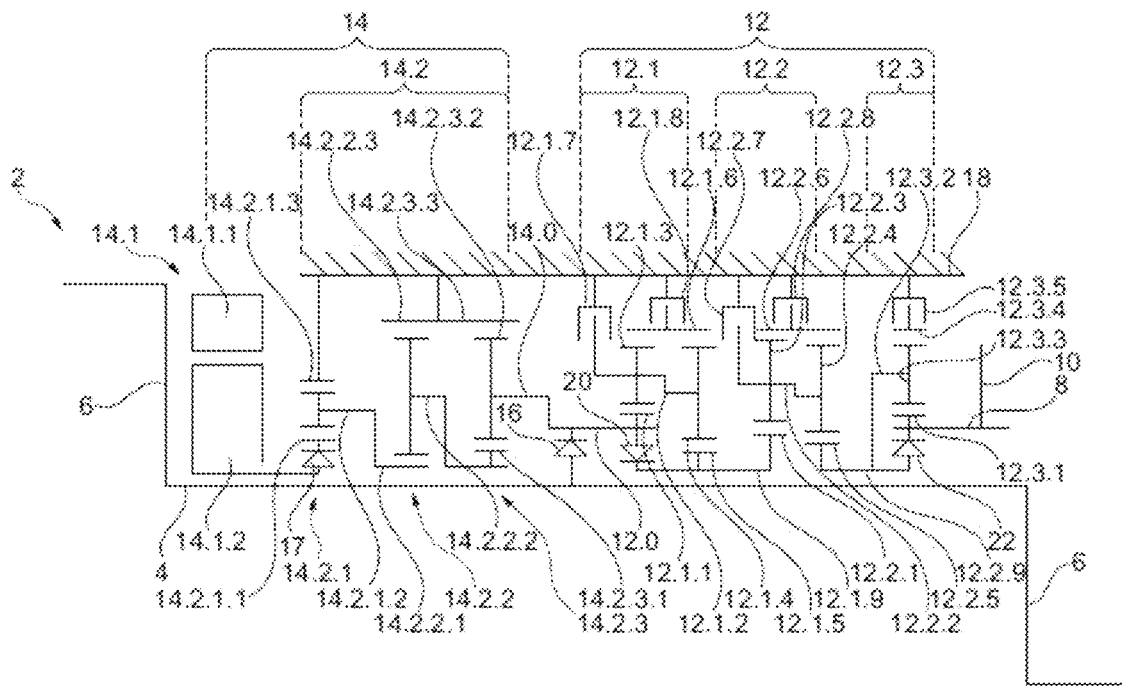
[Fig. 2]
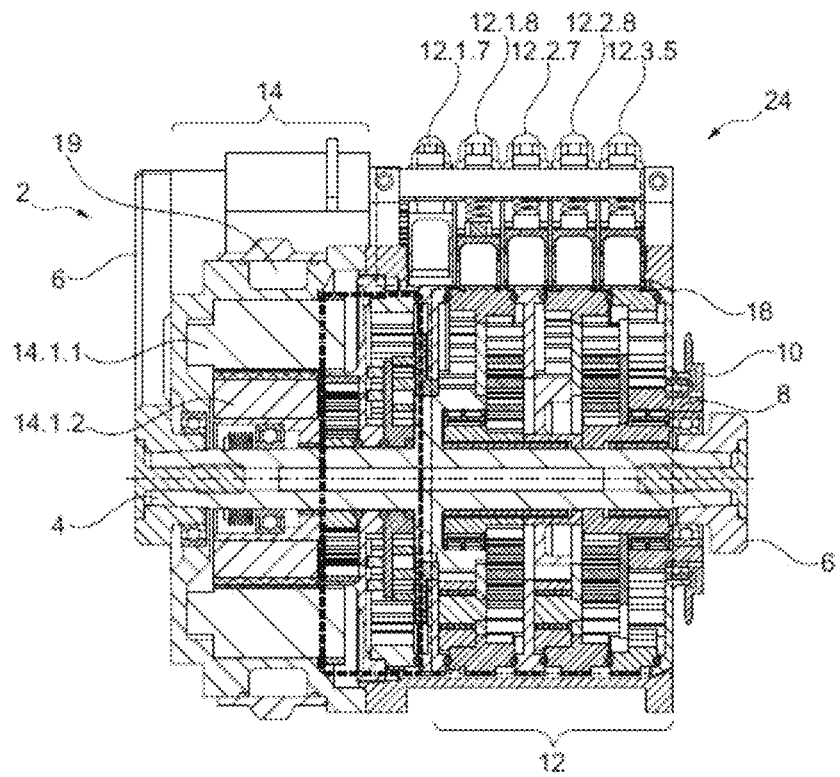

[Fig. 3]
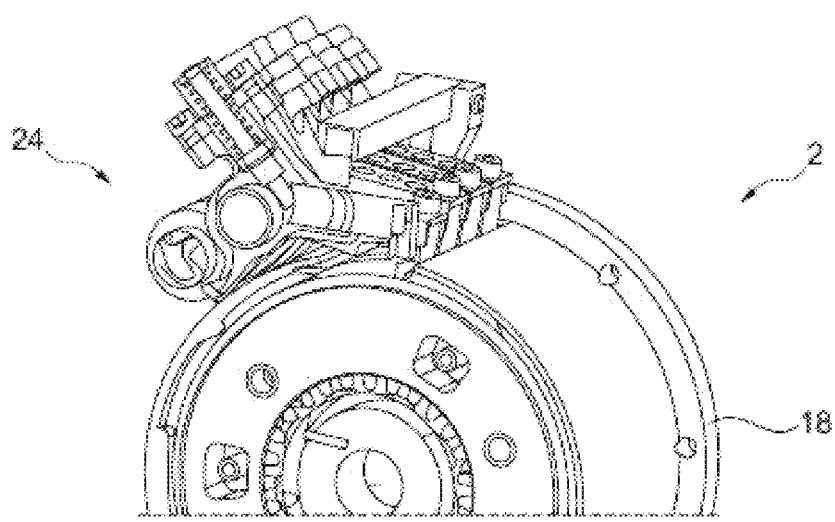
[Fig. 4]
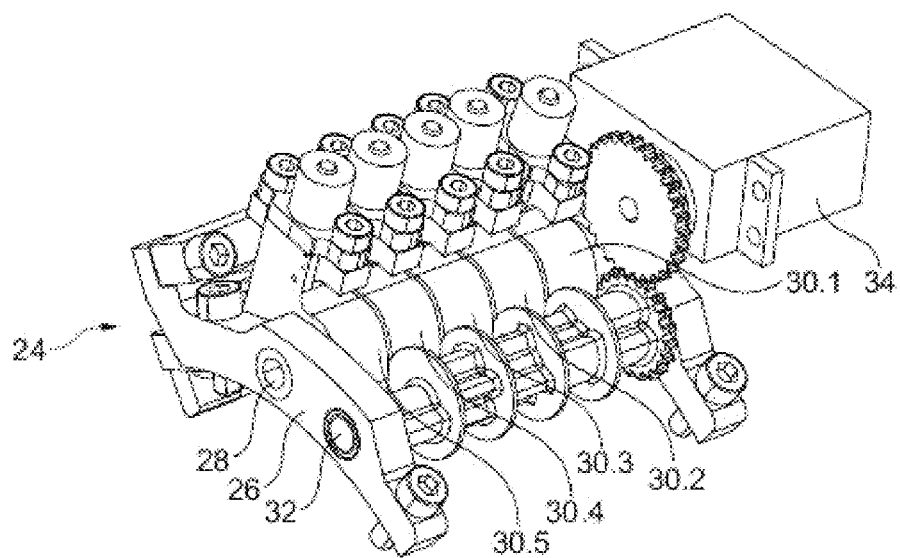

[Fig. 5]
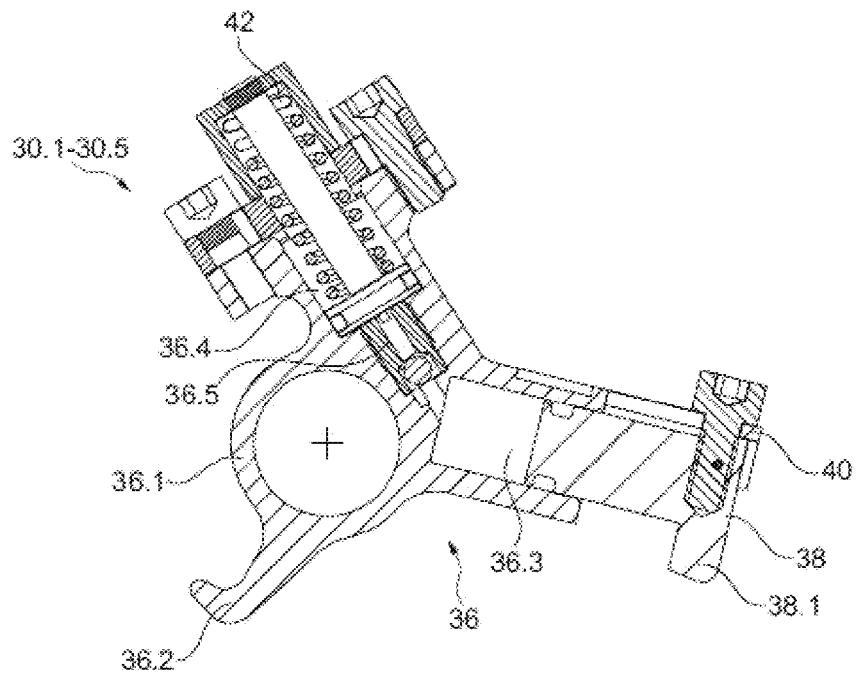
[Fig. 6]
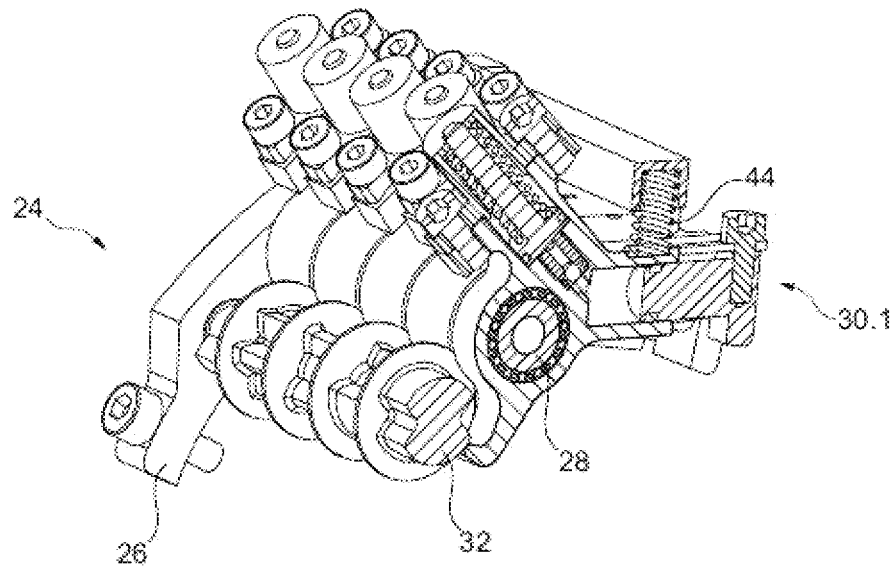

[Fig. 7]
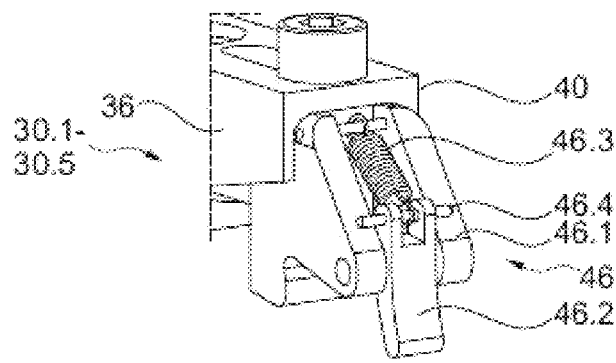
[Fig. 8]
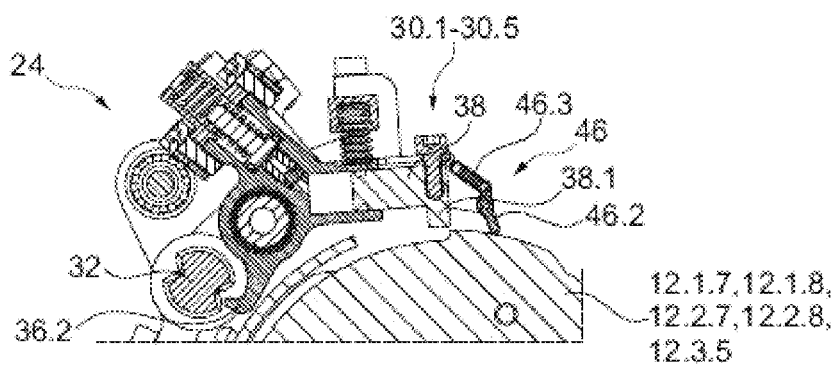
[Fig. 9]
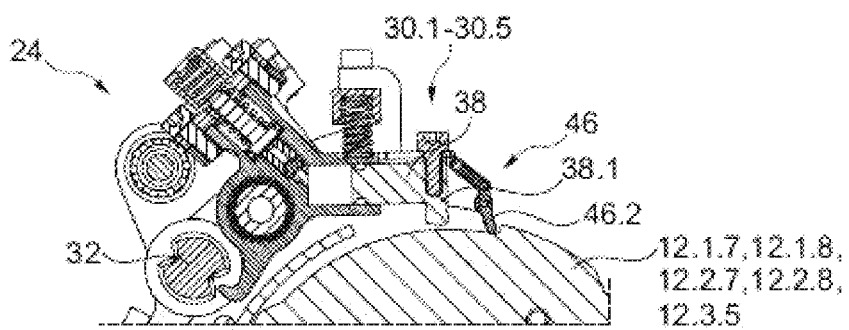
[Fig. 10]
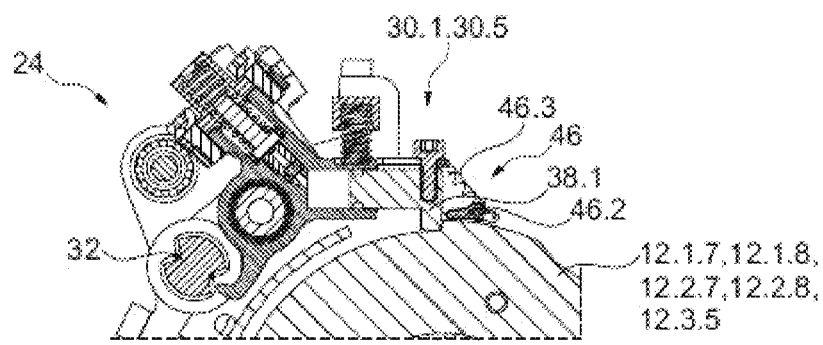

TRANSMISSION UNIT FOR VEHICLE EQUIPPED WITH PROPULSION PEDALS

CROSS-REFERENCE TO RELATED APPLICATIONS

The present invention is the US national stage under 35 U.S.C. § 371 of International Application No. PCT/EP2023/058429 filed on Mar. 31, 2023, which claims the priority of application LU501762 filed on Mar. 31, 2022, the contents of which (text, drawings and claims) are incorporated here by reference in their entirety.

FIELD

The invention is directed to the field of transmission for muscle driven vehicles equipped with propulsion pedals, like bicycles, in particular electrically assisted bicycles.

BACKGROUND

Prior art patent document published WO 2019/0158811 A1 discloses a drive assembly for bicycle, configured to be mounted on the bicycle frame and supporting the pedal arms. The drive assembly comprises a central input shaft supporting the pedal arms, a coaxial output shaft supporting a chain sprocket. The power transmission between the input shaft and the output shaft comprises a series of planetary gear units operatively connected to each other and whose ring gear, planetary gear carrier or sun gear can be selectively stopped by frictional braking units, so as to provide different transmission ratios. The use of frictional braking units is advantageous for smooth speed shifting, however lowers the mechanical efficiency of the transmission due to the frictional losses during shifting and the energy required for operating the shifting. The drive assembly also comprises an electric motor that is operatively permanently coupled to the input shaft, which is not favourable when using the drive assembly without power input of the electric motor. Also, the electric motor is positioned radially laterally relative to the central input and output shafts and operatively coupled to the power transmission via a reducing gearing. This increases the volume of the drive system and potentially raises the gravity centre of the bicycle.

Prior art patent document published US 2012/0071290 A1 discloses a drive assembly for bicycles, configured to be mounted on the bicycle frame and supporting pedal arms. The drive assembly comprises a central input shaft supporting the pedal arms, a coaxial output shaft supporting a chain sprocket. The power transmission between the input shaft and the output shaft comprises a series of planetary gear units operatively connected to each other. The central input shaft comprises ratchet pawls pivotally mounted in recesses formed in the central input shaft. A tubular transmission shaft extends around the central input shaft and comprises pawl operation holes which allow, by rotation of the transmission shaft to selectively activate torque transmission to a specific sun gear while disactivate torque transmission to the other sun gears and thereby achieved different gear ratios. This construction has for advantage to be very compact; however, it has for disadvantage that gear shifting under load is difficult. Also, it does not provide any input from an auxiliary electric motor.

SUMMARY OF INVENTION

The invention has for technical problem to overcome at least one drawback of the above-mentioned prior art. More specifically, the invention has for technical problem to provide a transmission unit for a vehicle equipped with propulsion pedals, like a bicycle, that is compact, has a high number of gear ratios, has a large transmission range, couples to an electric motor and provides a smooth great shifting under load.

The invention is directed to transmission unit for a vehicle equipped with propulsion pedals, comprising: a central shaft with two opposite ends configured, each, for supporting a pedal crank; a transmission output shaft coaxial with the central shaft and configured for outputting mechanical power; a planetary gear unit carried by the central shaft and configured for transmitting mechanical power from an input shaft of the planetary gear unit to the transmission output shaft, according to several selectable transmission ratios; an electric motor unit operatively coupled to the planetary gear unit in order to transmit mechanical power to the transmission output shaft; a housing carrying the central shaft, the transmission output shaft and the planetary gear unit; wherein the electric motor unit is coaxial with the central shaft and comprises an output shaft fixedly coupled to the input shaft of the planetary gear unit, and the central shaft is coupled to the output shaft of the electric motor and the input shaft of the planetary gear unit by a freewheel.

According to an exemplary embodiment, the electric motor unit comprises an electric motor coaxial with the central shaft, and a planetary gear reduction unit coaxial with the central shaft and coupled to the electric motor.

According to an exemplary embodiment, the planetary gear reduction unit comprises: a first planetary gear set with a sun gear coupled to the electric motor, a fixed ring gear, and a planetary gear carrier; a second planetary gear set with a sun gear fixedly coupled to the planetary gear carrier of the first planetary gear set, a fixed ring gear, and a planetary gear carrier coupled to the output shaft of the electric motor unit.

According to an exemplary embodiment, the planetary gear reduction unit further comprises: a third planetary gear set with a sun gear fixedly coupled to the planetary gear carrier of the second planetary gear set, a fixed ring gear, and a planetary gear carrier fixedly coupled to the output shaft of the electric motor unit.

According to an exemplary embodiment, the electric motor unit is located on an end portion of the central shaft.

Advantageously, the transmission unit comprises an annular cavity surrounding the electric motor and configured for containing a liquid for cooling the electric motor. The cavity can be formed on a portion of the housing that receives a stator of the electric motor. The annular cavity is formed by metallic material that contacts directly the stator of the electric motor.

According to an exemplary embodiment, the planetary gear unit comprises a double planetary gear set comprising a ring gear, a first sun gear, first planetary gears meshing with the first sun gear and with the ring gear, a second sun gear, second planetary gears meshing with the second sun gear and with the ring gear, a carrier of the first and second planetary gears, a carrier brake and a ring gear brake, the first sun gear being formed on the input shaft of the planetary gear unit and the second sun gear being formed on an output shaft of the double planetary gear set.

According to an exemplary embodiment, the freewheel is a first freewheel, the input shaft of the planetary gear unit being coupled to the output shaft of the double planetary gear set by a second freewheel, in order to bypass the double planetary gear set when the ring gear brake is released and the carrier brake is released.

Advantageously, the electric motor unit is coupled to the input shaft of the planetary gear unit by a freewheel so that rotation of the electric motor drives the input shaft, whereas the input shaft can be driven without driving the electric motor. That freewheel can be provided operatively between the electric motor and the input shaft of the planetary gear unit.

According to an exemplary embodiment, the planetary gear unit further comprises an additional double planetary gear set comprising a ring gear, a first sun gear, first planetary gears meshing with the first sun gear and with the ring gear, a second sun gear, second planetary gears meshing with the second sun gear and with the ring gear, a carrier of the first and second planetary gears, a carrier brake and a ring gear brake, the first sun gear being formed on the output shaft of the double planetary gear set and the second sun gear being coupled to the transmission output shaft.

According to an exemplary embodiment, the planetary gear unit comprises an output planetary gear set comprising an input shaft, a ring gear, a sun gear formed on the transmission output shaft, planetary gears meshing with the ring gear and the sun gear, a carrier of the planetary gears, fixedly coupled to the input shaft, a ring brake, the input shaft being coupled with the transmission output shaft by a freewheel, so as to by-pass the output planetary gear set when the ring brake is released.

According to an exemplary embodiment, the input shaft of the output planetary gear set is the output shaft of the double planetary gear set or, if present, of the additional double planetary gear set.

According to an exemplary embodiment, the double planetary gear set and, if present, the additional double planetary gear set provide(s), by selectively activating the carrier brake(s) and ring gear brake(s) of the double planetary gear set and, if present, the additional double planetary gear set, at least three transmission ratios comprising a maximum ratio and a minimum ratio, and the output planetary gear set provides, by selectively activating the ring brake of the output planetary gear set, two range transmission ratios with a difference between the range transmission ratios that is greater than a difference between the at least three transmission ratios.

According to an exemplary embodiment, the ring gear brake and the carrier brake or each of the ring gear brakes and carrier brakes is of the dog type.

According to an exemplary embodiment, the ring gear brake or each of the ring gear brakes comprises stops distributed along a periphery of the corresponding ring gear and a movable dog configured for selectively engaging in one of the stops for blocking the corresponding ring gear.

According to an exemplary embodiment, the movable dog or each of the movable dogs is pivotable and actuatable by a rotatable cam.

According to an exemplary embodiment, the movable dog or each of the movable dogs comprises a cam follower and a finger with a tooth extending laterally and configured for engaging the corresponding recess.

According to an exemplary embodiment, the finger or each finger is configured so that the corresponding tooth is movable along the finger against an elastic force. That movement is advantageously a translation movement, e.g a sliding movement.

According to an exemplary embodiment, the movable dog or each of the movable dogs comprises a bore and the finger or each finger is slidingly received in the bore, the finger carrying the corresponding tooth and delimiting with the bore a chamber containing a medium providing the elastic force.

According to an exemplary embodiment, the medium is a spring, a gas, or a liquid in communication with an auxiliary chamber delimited by an elastic element such as a spring-piston assembly.

Advantageously, the communication between the chamber and the auxiliary chamber comprises a check-valve with a flow restriction when the liquid medium flows from the chamber to the auxiliary chamber and without restriction in the opposite direction.

According to an exemplary embodiment, the movable dog or each of the movable dogs comprises an engagement controller configured for allowing engagement of the movable dog with the stop or one of the stops only when the movable dog is at a distance from the stop.

According to an exemplary embodiment, the engagement controller or each of the engagement controllers comprises a contact member configured for sliding along the periphery of the corresponding ring gear and carrier and pivotally mounted on the movable dog between an extended position preventing engagement and a retracted position allowing engagement, and a spring urging the contact member in the extended position. The contact member is positioned for contacting the periphery of the corresponding ring gear and carrier before, in the sense of rotation of the corresponding ring gear and carrier, a portion of the movable dog engaging with a stop, the portion being for instance the tooth of the finger of the movable dog.

Advantageously, the planetary gear unit and the electric motor unit are concentric with the central axis and supported by the central axis.

The invention is also directed to a vehicle equipped with propulsion pedals and comprising a transmission unit carrying the propulsion pedals and configured for driving at least one wheel of the vehicle upon activation of the pedal; wherein the transmission unit is accord to the invention.

The invention can also be directed to a brake assembly for one or more planetary gear sets, comprising: a body, a pivoting shaft, one or more dog elements pivotally mounted on the pivoting shaft, a cam shaft with one or more cams cooperating with the one or more dog elements, respectively, a shifting unit operatively coupled to the cam shaft for selectively pivoting the one or more dog elements.

Advantageously, each dog element comprises a finger with a tooth extending essentially transversally from the finger, for engaging with a stop at the periphery of a ring or carrier of the one or more planetary gear sets.

Advantageously, for each dog element, the finger is slidably mounted in a bore formed in a body of the dog element, the finger delimiting with the bore a chamber containing a medium providing an elastic force.

Advantageously, the medium is a spring, a gas, or a liquid communication with an auxiliary chamber delimited by an elastic element such as a spring-piston assembly.

Advantageously, the communication between the chamber and the auxiliary chamber comprises a check-valve with a flow restriction when the liquid medium flows from the chamber to the auxiliary chamber and without restriction in the opposite direction.

The invention is particularly interesting in that it provides a compact transmission unit including an electric motor. The latter is centred on the central shaft and thereby is optimally integrated to the transmission unit.

The planetary gear unit can provide a high number of transmission ratios with a large range while remaining compact. The construction of the double planetary gear set and any additional double planetary gear set is particularly interesting that respect. Also, the planetary gear unit provides a useful range splitter, participating in providing a large transmission range.

The planetary gear reduction unit of the electric motor unit provides a high transmission reduction ratio while remaining compact and fully integrated by being coaxial and lateral with the planetary gear unit.

Also, the different freewheels provides interesting functionalities to the transmission unit.

Further, the brake assembly of the dog type achieves a rapid gear shifting without losses inherent of frictional brake assemblies and very low activation forces compared to frictional brakes.

BRIEF DESCRIPTION OF THE DRAWINGS

FIG. 1 is schematic functional layout of a transmission unit according to the invention.

FIG. 2 is a sectional view of the transmission unit schematically represented in FIG. 1.

FIG. 3 is perspective representation of the brake assembly of the ring gears of the transmission unit of FIG. 2.

FIG. 4 is another perspective representation of the brake assembly of FIG. 4.

FIG. 5 is a sectional view of one of the ring gear brakes and carrier brakes of the brake assembly of FIGS. 3 and 4.

FIG. 6 is a perspective view of the brake assembly of FIGS. 3 to 5, where one of the ring gear brakes and carrier brakes is represented in sectional view.

FIG. 7 is a perspective view of one of the ring gear brakes and carrier brakes, with an optional engagement controller.

FIG. 8 is a sectional view of the brake assembly equipped with the engagement controller and of a portion of one of the rings and planetary carriers, in a first engagement configuration.

FIG. 9 corresponds to FIG. 8 in another engagement configuration.

FIG. 10 corresponds to FIG. 8 in further other engagement configuration.

DETAILED DESCRIPTION

In the following description, several freewheels are mentioned with reference to the drawings, for instance the freewheels 16, 17, 20 and 22, which are represented in FIG. 1 in a schematic way by a diode symbol as in electric wiring plans. This is for the sake of clarity and conciseness. It is to be understood that the direction represented by the arrow corresponds to direction in which the rotational movement is transmitted. The freewheel(s) can be formed by rachet pawls carried by a first rotating element and resiliently urged towards a notched surface of second directly neighbouring rotating element, so that in one rotating direction, the pawls engage with the notches and rotation of the first element is transmitted to the second element, whereas in the opposite rotating direction, the pawls slide on the notches and there is no rotation transmission. Other constructions can be considered.

FIGS. 1 and 2 illustrate a transmission unit according to the invention. FIG. 1 is a schematic functional layout whereas FIG. 2 is a sectional view.

The transmission unit 2 comprises a central shaft 4 with two opposite ends configured, each, for supporting a pedal crank 6, a transmission output shaft 8 coaxial with the central shaft 4 and configured outputting mechanical power via a chain sprocket 10 attached to the transmission output shaft 8. The transmission unit 2 further comprises a planetary gear unit 12 carried by the central shaft 4 and configured for transmitting mechanical power from an input shaft 12.0 of the planetary gear unit 12 to the transmission output shaft 8, according to several selectable transmission ratios, and an electric motor unit 14 operatively coupled to the planetary gear unit 12 in order to transmit mechanical power to the transmission output shaft 8. The transmission unit 2 further comprises a housing 18 carrying the central shaft 4, the transmission output shaft 8, the planetary gear unit 12 and the electric motor unit 14. As this is apparent, the planetary gear unit 12 comprises several planetary gear sets, for instance three planetary gear sets 12.1, 12.2 and 12.3, arranged operatively one after the other. Each of the planetary gear sets 12.1, 12.2 and 12.3 comprises one or several brakes of different components of the planetary gear sets, the brakes being carried by the housing 18. The planetary gear sets 12.1 and 12.2 advantageously have the same construction principle, whereas they can have different dimensions, i.e. different teeth modules and/or different numbers of teeth one each gear.

The electric motor unit 14 is coaxial with the central shaft and arranged laterally to the planetary gear unit 12. It comprises an output shaft 14.0 fixedly coupled to the input shaft 12.0 of the planetary gear unit 12. The central shaft 4 is coupled to the output shaft 14.0 of the electric motor unit 14 and the input shaft 12.0 of the planetary gear unit 12 by a freewheel 16. This arrangement provides a direct coupling between the electric motor unit 14 and the planetary gear unit 12 while the coupling of the central shaft 4 which is driven by the user allows the output shaft 14.0 of the electric motor unit 14 and the input shaft 12.0 of the planetary gear unit 12 to rotate at a higher rotational speed than the central shaft 4, by virtue of the freewheel 16.

The electric motor unit 14 comprises an electric motor 14.1 which comprises, essentially, a stator 14.1.1 and a rotor 14.1.2, the latter being carried by a shaft rotatably mounted on the central shaft 4. The electric motor unit 14 further comprises a planetary gear reduction unit 14.2 coaxial with the central shaft 4 and coupled to the electric motor 14.1. The planetary gear reduction unit 14.2 comprises a first planetary gear set 14.2.1 with a sun gear 14.2.1.1 coupled to the electric motor 14.1 via the shaft carrying the rotor 14.1.2, a fixed ring gear 14.2.1.3, and a planetary gear carrier 14.2.1.2; a second planetary gear set 14.2.2 with a sun gear 14.2.2.1 fixedly coupled to the planetary gear carrier 14.2.1.2 of the first planetary gear set 14.2.1, a fixed ring gear 14.2.2.3, and a planetary gear carrier 14.2.2.2, and a third planetary gear set 14.2.3 with a sun gear 14.2.3.1 fixedly coupled to the planetary gear carrier 14.2.2.2 of the second planetary gear set 14.2.2, a fixed ring gear 14.2.3.3, and a planetary gear carrier 14.2.3.2 fixedly coupled to the output shaft 14.0 of the electric motor unit 14. Advantageously, the fixed ring gears 14.2.2.3 and 14.2.3.3 of the second and third planetary gear sets 14.2.2 and 14.2.3 are common, i.e. form a single ring gear, for constructional simplicity and manufacturing cost reduction.

As illustrated in FIG. 1, the electric motor unit 14 can comprise a freewheel such as the freewheel 17, such that rotation of the central shaft 4 can drive the transmission output shaft 8 without having to drive the electric motor 14.1, for instance its rotor 14.1.2 which shows inertia and generates a resisting cogging torque when not supplied with electrical energy. The freewheel 17 is for instance provided between the rotor 14.1.2 and the sun gear 14.2.1.1 of the first planetary gear set 14.2.1, being however understood that the freewheel could be provided at other places in the planetary gear reduction unit 14.2.

The above constructions of planetary gear reduction unit 14.2 achieves a high reduction ratio while taking about less than half of the useful length of the central shaft 4, and remaining compact radially, as this more apparent in FIG. 2.

The planetary gear unit 12 comprises a first planetary gear set 12.1 being for instance a double planetary gear set comprising a ring gear 12.1.6, a first sun gear 12.1.1, first planetary gears 12.1.3 meshing with the first sun gear 12.1.1 and with the ring gear 12.1.6, a second sun gear 12.1.5, second planetary gears 12.1.4 meshing with the second sun gear 12.1.5 and with the ring gear 12.1.6, a carrier 12.1.2 of the first and second planetary gears 12.1.3 and 12.1.4, a carrier brake 12.1.7 and a ring gear brake 12.1.8, the first sun gear 12.1.1 being formed on the input shaft 12.0 of the planetary gear unit 12 and the second sun gear 12.1.5 being formed on an output shaft 12.1.9 of the double planetary gear set 12.1.

As this is apparent, the input shaft 12.0 of the planetary gear unit 12 is coupled to the output shaft 12.1.9 of the double planetary gear set 12.1 by a freewheel 20, in order to bypass the double planetary gear set 12.1 when both the ring gear brake 12.1.8 and the carrier brake 12.1.7 are released.

The planetary gear unit 12 can further comprise a second planetary gear set 12.2 being for instance an additional double planetary gear set comprising a ring gear 12.2.6, a first sun gear 12.2.1, first planetary gears 12.2.3 meshing with the first sun gear 12.2.1 and with the ring gear 12.2.6, a second sun gear 12.2.5, second planetary gears 12.2.4 meshing with the second sun gear 12.2.5 and with the ring gear 12.2.6, a carrier 12.2.2 of the first and second planetary gears 12.2.3 and 12.3.4, a carrier brake 12.2.7 and a ring gear brake 12.2.8, the first sun gear 12.2.1 being formed on the output shaft 12.1.9 of the double planetary gear set 12.1. The second sun gear 12.2.5 is rigidly carried by an output shaft 12.2.9 of the additional double planetary gear set 12.2.

In the above additional double planetary gear set 12.2, it is possible to provide a freewheel (not represented) between the first sun gear 12.2.1 and the second sun gear 12.5.1, similarly the freewheel 20 of the double planetary gear set 12.1. This provides at least one additional speed or gear ratio, for instance when each of the carrier brake 12.2.7 and the ring brake 12.2.8 are not activated.

The planetary gear unit 12 further comprises a third planetary gear set 12.3 being for instance an output planetary gear set comprising a ring gear 12.3.4, a sun gear 12.3.1 formed on the transmission output shaft 8, planetary gears 12.3.3 meshing with the ring gear 12.3.4 and the sun gear 12.3.1, a carrier 12.3.2 of the planetary gears 12.3.3, fixedly coupled to the output shaft 12.2.9 of the additional double planetary gear set 12.2, a ring brake 12.3.5, the output shaft 12.2.9 being coupled with the transmission output shaft 8 by a freewheel 22, so as to by-pass the output planetary gear set 12.3 when the ring brake 12.3.5 is released.

The above-described planetary gear unit 12 provides 10 different gear ratios that will be detailed here after in connection with the below table 1. In that table, the sign #corresponds to the different gear or speed number, whose transmission ratio progressively diminishes with the speed number. In other words, the speed number #1 is for starting the vehicle or bicycle at low speed whereas the speed number #10 is for driving or riding at maximum speed. The symbol "x" means that the brake or freewheel is activated, being understood that for the brake the activation is active whereas for the freewheel it is passive, i.e. results of the activation and non-activation of the brakes.

TABLE 1

| # | 1st planetary gear set 12.1 | | | 2nd planetary gear set 12.2 | | 3rd planetary gear set 12.3 | |
|---|---|---|---|---|---|---|---|
| | Brake 12.1.7 of planetary gears carrier 12.1.2 | Brake 12.1.8 of ring gear 12.1.6 | Freewheel 20 | Brake 12.2.7 of planetary gears carrier 12.2.2 | Brake 12.2.8 of ring gear 12.2.6 | Brake 12.3.5 of ring gear 12.3.4 | Freewheel 22 |
| 1 | | | x | | x | | x |
| 2 | | | x | x | | | x |
| 3 | | x | | | x | | x |
| 4 | | x | | x | | | x |
| 5 | x | | | x | | | x |
| 6 | | | x | | x | x | |
| 7 | | | x | x | | x | |
| 8 | | x | | | x | x | |
| 9 | | x | | x | | x | |
| 10 | x | | | x | | x | |

In the speed number #1, none of the brakes of the 1st planetary gear set 12.1 is activated, meaning that the freewheel 20 is active. The power is then transmitted directly, i.e. without any change of rotational speed, from the input shaft 12.0 of the transmission unit 12 to the output shaft 12.1.9 of the 1st planetary gear set 12.1. In the 2nd planetary gear set 12.2, the brake 12.2.8 of the ring gear 12.2.6 is activated, meaning that the power is transmitted through rotation of the planetary gears 12.2.3 and 12.2.4 and of their carrier 12.2.2, from the first sun gear 12.2.1 to the second sun gear 12.2.5 rigidly carried by the output shaft 12.2.9 of the 2nd planetary gear set 12.2. In the 3rd planetary gear set 12.3, the brake 12.3.5 of the ring gear 12.3.4 is deactivated, meaning that the power is transmitted through the freewheel 22 to the output shaft 8.

In the speed number #2, the configuration of the 2nd planetary gear set 12.2 is changed by deactivating the brake 12.2.8 of the ring gear 12.2.6 and activating the brake 12.2.7 of planetary gears carrier 12.2.2. The power is therefore transmitted from the first sun gear 12.2.1 to the second sun gear 12.2.5 via the planetary gears 12.2.3 and 12.2.4 free to rotate while their carrier 12.2.2 is blocked.

In the speed number #3, the $2^{nd}$ planetary gear set 12.2 and $3^{rd}$ planetary gear set 12.3 are as in the speed number #1, whereas in the $1^{st}$ planetary gear set 12.1, the brake 12.1.8 of ring gear 12.1.6 is activated, meaning that the power is transmitted through rotation of the planetary gears 12.1.3 and 12.1.4 and of their carrier 12.1.2, from the first sun gear 12.1.1 to the second sun gear 12.1.5 rigidly carried by the output shaft 12.1.9 of the $1^{st}$ planetary gear set 12.1.

In the speed number #4, compared with the speed number #3, the configuration of the $2^{nd}$ planetary gear set 12.2 is changed by deactivating the brake 12.2.8 of the ring gear 12.2.6 and activating the brake 12.2.7 of planetary gears carrier 12.2.2, similarly to the speed number #2.

In the speed number #5, compared with the speed number #4, the configuration of the $1^{st}$ planetary gear set 12.1 is changed by deactivating the brake 12.1.8 of the ring gear 12.1.6 and activating the brake 12.1.7 of planetary gears carrier 12.1.2, meaning that the power is transmitted from the first sun gear 12.1.1 to the second sun gear 12.1.5 via the planetary gears 12.1.3 and 12.1.4 free to rotate while their carrier 12.1.2 is blocked.

In the speed number #6, compared with the speed number #1, on the $3^{rd}$ planetary gear set 12.3, the brake 12.3.5 of the ring gear 12.3.4 is activated, meaning that the power is transmitted through rotation of carrier 12.3.2 and the planetary gears 12.3.3 to the sun gear 12.3.1 rigidly carried by the transmission output shaft 8.

The speed number #7 is similar to the speed number #2 while the $3^{rd}$ planetary gear set 12.3 is as in the speed number #6.

The speed number #8 is similar to the speed number #3 while the $3^{rd}$ planetary gear set 12.3 is as in the speed numbers #6 and #7.

The speed number #9 is similar to the speed number #4 while the $3^{rd}$ planetary gear set 12.3 is as in the speed numbers #6, #7 and #8.

The speed number #10 is similar to the speed number #5 while the $3^{rd}$ planetary gear set 12.3 is as in the speed numbers #6, #7, #8 and #9.

In the case of the presence an additional freewheel (not represented) between the first sun gear 12.2.1 and the second sun gear 12.2.5, an additional speed is obtained where none of the ring and carrier brakes is activated, meaning that the freewheels 20 and 22 are activated and the additional one mentioned here above also, corresponding to the 1:1 transmission ratio between the central shaft 4 and the transmission output shaft 8. With reference to the above table 1, that additional speed could be named speed number #0.

As this more visible in FIG. 2, the brakes, i.e. the carrier brake 12.1.7 and ring brake 12.1.8 of the $1^{st}$ planetary gear set 12.1, the carrier brake 12.2.7 and the ring brake 12.2.8 of the $2^{nd}$ planetary gear set 12.2, and the ring brake 12.3.5 of the $3^{rd}$ planetary gear set 12.3 are advantageously of the dog type, i.e. with a movable dog configured for selectively engaging with a stop formed on an external surface of the carrier or ring to be braked. That type of brake has the advantage to avoid frictional movements between the carrier or ring to be braked and the movable element of the brake interacting with the carrier or ring.

All brakes 12.1.7, 12.1.8, 12.2.7, 12.2.8 and 12.3.5 are for instance formed by a brake assembly 24 attached to the housing 18 of the transmission unit 2.

Still in FIG. 2, we can observe that the housing 18 houses the electric motor, for instance the stator 14.1.1 thereof and that a cavity 19 is formed with the housing around the stator 14.1.1, the cavity 19 being specifically designed for containing a liquid for cooling the stator. For instance, that cavity 19 forms a recess on the outer circular surface for the housing 18, that is closed in a liquid tight fashion by a ring placed around the housing and recess. It is understood that annular cavity 19 can be constructed differently while still achieving a useful cooling of the electric motor.

FIGS. 3 to 6 are different views of the brake assembly 24 of FIG. 2.

FIG. 3 shows in perspective the brake assembly 24 cooperating with the ring-shaped planetary gears carriers and the rings of the planetary gear sets 12.1, 12.2 and 12.3 of the transmission unit 2. As this is apparent, the brake assembly 24 comprises a series of, for instance five, pivoting dog elements cooperating with the stops formed at the outer periphery of the corresponding ring-shaped planetary gears carriers and rings.

FIG. 4 is a perspective view of the brake assembly 24 alone, seen from an opposite point of view as in FIG. 2.

The brake assembly 24 comprises a body 26 and a pivot axis 28 mounted on the body 26 and supporting the dog elements 30.1, 30.2, 30.3, 30.4 and 30.5. The dog elements 30.1, 30.2, 30.3, 30.4 and 30.5 are moved by virtue of the cam shaft 32 that is rotated by the shift unit 34 comprising an electric motor and gearing coupling the electric motor with the cam shaft 32. The latter comprises a series of, for instance five, cams each interacting with one of the dog elements 30.1, 30.2, 30.3, 30.4 and 30.5 so as to pivot them in a selective manner.

FIG. 5 is section view of the one of the dog elements 30.1, 30.2, 30.3, 30.4 and 30.5, being understood that they are all identical or at least similar in their principle.

Each dog elements 30.1, 30.2, 30.3, 30.4 and 30.5 comprises a body 36 with a central hole 36.1 for receiving the pivoting axis 28 (FIG. 4), a cam follower 36.2, a first bore 36.3 slidably receiving a finger 38 with a tooth 38.1 extending laterally and configured for engaging one stop on the corresponding ring-shaped planetary gears carrier or ring, a second bore 36.4 slidably receiving a piston and spring assembly 42, and a fluid passage 36.5 interconnecting the first bore 36.3 with the second bore 36.4.

As this is apparent, the body 36 is provided with a retaining means 40 preventing the finger 38 from separating of the body 36 while allowing the finger 38 to be slidable in the first bore 36.3. The retaining means 40 is for instance a protrusion rigidly attached to or formed with the body 36, and showing an oblong hole into which a screw slidingly engages and rigidly engages with the finger 38. As this is apparent the cylindrical portion of the finger 38 that engages in the first bore 36.3 is provided with a gasket so as to delimit in the first bore 36.3 a first chamber that communicates via the passage 36.5 with a second chamber delimited in the second bore 36.4 by the piston of the piston-spring assembly 42 mounted on the body 36. In the configuration as illustrated in FIG. 5, the second chamber shows a minimum volume, being for instance null, whereas the first chamber shows a maximum volume. The first chamber, the passage 36.5 and the second chamber are filled by a fluid, in various instances a fluid that is incompressible, i.e. a liquid like oil. At rest, the finger 38 is urged in the illustrated extended position by the spring pushing the piston of the spring-piston assembly 42 towards the bottom of the second bore 36.4, thereby pushing, via the passage 36.5, the fluid towards the first chamber.

During operation of the transmission unit 2, when the brake assembly 24 is operated to as to rotate the cam shaft 32 (FIG. 4) and thereby pivot one of the dog elements 30.1, 30.2, 30.3, 30.4 and 30.5 via the cam follower 36.2 so that its tooth 38.1 engages with one of the stops formed at the outer periphery of the corresponding ring-shaped planetary gears carrier or ring. The engagement of the tooth with one of the recesses occurs while the corresponding ring-shaped planetary gears carrier or ring is rotating, meaning that the carrier or ring is abruptly decelerated while important forces are generated between the tooth and the stop. These forces can be lowered by the sliding movement of the finger 38 relative to the body 36. Upon engagement of the tooth with the stop, an important force is transmitted from the rotating carrier or ring to the finger 38 causing movement thereof towards the bottom of the first chamber in the first bore 36.3 and movement of the fluid towards the second chamber in the second bore 36.4 via the passage 36.5, against the resilient force of the spring that progressively increases while the fluid fills the second chamber and moves the piston away from the bottom of the second chamber. This movement dampens the braking action of the dog element engaging with one of the recesses.

The passage 36.5 can comprise a check-valve with a flow restriction, configured so as to create a flow restriction when the fluid flows from the first chamber in the first body 36.3 towards the second chamber in the second body 36.4 while allowing the fluid to flow without such restriction in the reverse direction.

FIG. 6 is another perspective view of the brake assembly 24, illustrating the potentially complex profiles of the cams on the cam shaft 32, as well as the presence of springs 44 urging each dog element 30.1, 30.2, 30.3, 30.4 and 30.5 towards engagement of their tooth with the corresponding the ring-shaped carriers or rings.

FIG. 7 is a perspective view of one of the ring and carrier brakes, for instance the dog element 30.1, 30.2, 30.3, 30.4 and 30.5, provided with an optional engagement controller 46. The latter is provided at the distal end of the body 36, for instance on the finger 38. It is configured for allowing engagement of the finger with the stop on the ring-shaped carriers or rings only when the tooth of the finger is at a distance from the stop, so as to avoid a later engagement that can damage the contact surfaces on the finger and the stop.

As this is apparent, the engagement controller 46 comprises a clevis 46.1 fixedly mounted or attached to the body 36 of the dog element 30.1, 30.2, 30.3, 30.4 and 30.5, a contact member 46.2 pivotally mounted on the clevis 46.1, a spring exerting a resilient force on the contact member 46.2 to as to urge it to the extended position illustrated in FIG. 7, an a stop pin 46.4 mounted on the contact member 46.2, parallel to its pivoting axis and configured for abutting against the clevis 46.1 when the contact member 46.2 is in the extended position.

FIGS. 8 to 10 are sectional views of the brake assembly 24 equipped with the engagement controller 46 and of a portion of one of the ring-shaped carriers or rings 12.1.7, 12.1.8, 12.2.7, 12.2.8 and 12.3.5, in three different engagement configurations.

In FIG. 8, the tooth 38.1 of the finger 38 is in position relative to the ring-shaped carrier or ring 12.1.7, 12.1.8, 12.2.7, 12.2.8 or 12.3.5 where it can engage with the stop, however at a late stage where the tooth will engage only partially with the stop, leading to damages of the respective contact surface. The partial engagement is essentially due to the fact the pivoting movement of the dog element 30.1, 30.2, 30.3, 30.4 or 30.5, although rapid, occurs while the ring-shaped carrier or ring 12.1.7, 12.1.8, 12.2.7, 12.2.8 or 12.3.5 is still rotating.

In the configuration of FIG. 8, the engagement controller 46 prevents engagement of the dog element 30.1, 30.2, 30.3, 30.4 or 30.5 despite the rotation of the cam shaft 32 presenting a recess of the cam profile to the cam follower 36.2. The contact member 46.2 slides along the outer periphery of the stop of the ring-shaped carrier or ring 12.1.7, 12.1.8, 12.2.7, 12.2.8 or 12.3.5, while remaining in the extended position by virtue of the force of the spring 46.4.

In the configuration of FIG. 9, the engagement controller 46 prevents full engagement of the dog element 30.1, 30.2, 30.3, 30.4 or 30.5 despite the rotation of the cam shaft 32 presenting a recess of the cam profile to the cam follower 36.2. The contact member 46.2 slides along the outer periphery of the ring-shaped carrier or ring 12.1.7, 12.1.8, 12.2.7, 12.2.8 or 12.3.5, before the spot thereof, while remaining in the extended position by virtue of the force of the spring 46.4.

In the configuration of FIG. 10, corresponding to a further step of the configuration of 9, the contact member 46.2 further to being contacted by the stop has pivoted to a retracted position allowing the dog element to further 30.1, 30.2, 30.3, 30.4 or 30.5 in the engagement direction until the tooth 38.1 fully engages with the stop.

The above-described brake assembly is particularly advantageous by its robustness and efficiency. By being mounted on the outside of the housing, its maintenance is greatly facilitated. More importantly, the mechanical engagement between the dog elements and the ring-shaped carriers and rings occurs at about the maximum radial distance of the central shaft, meaning that the forces generated by these engagements are minimum for a given torque. It also provides an efficient shifting of the transmission unit in that the transmission energy losses substantially reduced compared with friction brakes while still providing smooth operation thanks to the engagement controller 46.

The above-described brake assembly can of course be applied to other configurations of transmission unit as to the one detailed here above in relation with FIGS. 1 and 2. It is indeed applicable to any planetary gear set, in particular when several planetary gear sets are mounted side by side as in the planetary gear unit detailed in FIGS. 1 and 2.

What is claimed is:

1. A transmission unit for a vehicle equipped with propulsion pedals, comprising:
   a central shaft with two opposite ends configured, each, for supporting a pedal crank;
   a transmission output shaft coaxial with the central shaft and configured for outputting mechanical power;
   a planetary gear unit carried by the central shaft and configured for transmitting mechanical power from an input shaft of said planetary gear unit to the transmission output shaft, according to several selectable transmission ratios;
   an electric motor unit operatively coupled to the planetary gear unit in order to transmit mechanical power to the transmission output shaft;
   a housing carrying the central shaft, the transmission output shaft and the planetary gear unit;
   wherein the electric motor unit is coaxial with the central shaft and comprises an output shaft fixedly coupled to the input shaft of the planetary gear unit, and
   wherein the central shaft is coupled to said output shaft of the electric motor unit and said input shaft of the planetary gear unit by a freewheel.

2. The transmission unit according to claim 1, wherein the electric motor unit comprises an electric motor coaxial with the central shaft, and a planetary gear reduction unit coaxial with the central shaft and coupled to said electric motor.

3. The transmission unit according to claim 2, wherein the planetary gear reduction unit comprises:
a first planetary gear set with a sun gear coupled to the electric motor, a fixed ring gear, and a planetary gear carrier;
a second planetary gear set with a sun gear fixedly coupled to the planetary gear carrier of the first planetary gear set, a fixed ring gear, and a planetary gear carrier coupled to the output shaft of the electric motor unit.

4. The transmission unit according to claim 3, wherein the planetary gear reduction unit further comprises:
a third planetary gear set with a sun gear fixedly coupled to the planetary gear carrier of the second planetary gear set, a fixed ring gear, and a planetary gear carrier fixedly coupled to the output shaft of the electric motor unit.

5. The transmission unit according to claim 1, wherein the electric motor unit is located on an end portion of the central shaft.

6. The transmission unit according to claim 1, wherein the planetary gear unit comprises a double planetary gear set comprising a ring gear, a first sun gear, first planetary gears meshing with the first sun gear and with the ring gear, a second sun gear, second planetary gears meshing with the second sun gear and with the ring gear, a carrier of the first and second planetary gears, a carrier brake and a ring gear brake, the first sun gear being formed on the input shaft of the planetary gear unit and the second sun gear being formed on an output shaft of the double planetary gear set.

7. The transmission unit according to claim 6, wherein the freewheel is a first freewheel, the input shaft of the planetary gear unit being coupled to the output shaft of the double planetary gear set by a second freewheel, in order to bypass said double planetary gear set when the ring gear brake is released and the carrier brake is released.

8. The transmission unit according to claim 6, wherein the planetary gear unit further comprises an additional double planetary gear set comprising a ring gear, a first sun gear, first planetary gears meshing with the first sun gear and with the ring gear, a second sun gear, second planetary gears meshing with the second sun gear and with the ring gear, a carrier of the first and second planetary gears, a carrier brake and a ring gear brake, the first sun gear being formed on the output shaft of the double planetary gear set and the second sun gear being coupled to the transmission output shaft.

9. The transmission unit according to claim 1, wherein the planetary gear unit comprises an output planetary gear set comprising an input shaft, a ring gear, a sun gear formed on the transmission output shaft, planetary gears meshing with the ring gear and the sun gear, a carrier of the planetary gears, fixedly coupled to the input shaft, a ring brake, the input shaft being coupled with the transmission output shaft by a freewheel, so as to by-pass the output planetary gear set when the ring brake is released.

10. The transmission unit according claim 9, wherein the input shaft of the output planetary gear set is the output shaft of a double planetary gear set comprising a ring gear, a first sun gear, first planetary gears meshing with the first sun gear and with the ring gear, a second sun gear, second planetary gears meshing with the second sun gear and with the ring gear, a carrier of the first and second planetary gears, a carrier brake and a ring gear brake, the first sun gear being formed on the input shaft of the planetary gear unit and the second sun gear being formed on an output shaft of the double planetary gear set, or of a supplementary double planetary gear set comprising a ring gear, a first sun gear, first planetary gears meshing with the first sun gear and with the ring gear, a second sun gear, second planetary gears meshing with the second sun gear and with the ring gear, a carrier of the first and second planetary gears, a carrier brake and a ring gear brake, the first sun gear being formed on the output shaft of the double planetary gear set and the second sun gear being coupled to the transmission output shaft.

11. The transmission unit according to claim 10, wherein the double planetary gear set and, if present, the additional double planetary gear set provide(s), by selectively activating the carrier brake(s) and ring gear brake(s) of said double planetary gear set and, if present, said additional double planetary gear set, at least three transmission ratios comprising a maximum ratio and a minimum ratio, and the output planetary gear set provides, by selectively activating the ring brake of said output planetary gear set, two range transmission ratios with a difference between said range transmission ratios that is greater than a difference between said at least three transmission ratios.

12. The transmission unit according to claim 6, wherein the ring gear brake and carrier brake or each of the ring gear brakes and carrier brakes is of the dog type.

13. The transmission unit according to claim 12, wherein the ring gear brake and the carrier brake or each of the ring gear brakes and carrier brakes comprises stops distributed along a periphery of the corresponding ring gear and carrier and a movable dog configured for selectively engaging in one of the stops for blocking said corresponding ring gear or carrier.

14. The transmission unit according to claim 13, wherein the movable dog or each of the movable dogs is pivotable and actuatable by a rotatable cam.

15. The transmission unit according to claim 14, wherein the movable dog or each of the movable dogs comprises a cam follower and a finger with a tooth extending laterally and configured for engaging the corresponding stop.

16. The transmission unit according to claim 15, wherein the finger or each finger is configured so that the corresponding tooth is movable along said finger against an elastic force.

17. The transmission unit according to claim 16, wherein the movable dog or each of the movable dogs comprises a bore and the finger or each finger is slidingly received in said bore, said finger carrying the corresponding tooth and delimiting with said bore a chamber containing a medium providing the elastic force.

18. The transmission unit according to claim 17, wherein the medium is a spring, a gas, or a liquid communication with an auxiliary chamber delimited by an elastic element such as a spring-piston assembly.

19. The transmission unit according to claim 13, wherein the movable dog or each of the movable dogs comprises an engagement controller configured for allowing engagement of the movable dog with the stop or one of the stops only when the movable dog is at a distance from the stop.

20. The transmission unit according to claim 19, wherein the engagement controller or each of the engagement controllers comprises a contact member configured for sliding along the periphery of the corresponding ring gear or carrier and pivotally mounted on the movable dog between an extended position preventing engagement and a retracted position allowing engagement, and a spring urging the contact member in the extended position.

* * * * *